United States Patent [19]

Kuznetsov

[11] Patent Number: 5,596,469

[45] Date of Patent: Jan. 21, 1997

[54] APPARATUS FOR LIMITING HIGH CURRENT ELECTRICAL FAULTS IN DISTRIBUTION NETWORKS BY USE OF SUPERCONDUCTING EXCITATION IN TRANSVERSE FLUX MAGNETIC CIRCUIT

[75] Inventor: Stephen B. Kuznetsov, Washington, D.C.

[73] Assignee: Power Superconductor Applications Co., Pittsburgh, Pa.

[21] Appl. No.: 599,863

[22] Filed: Feb. 13, 1996

Related U.S. Application Data

[63] Continuation of Ser. No. 163,434, Dec. 8, 1993, abandoned.

[51] Int. Cl.$^6$ ........................................... H02H 9/02
[52] U.S. Cl. .................. 361/58; 361/19; 361/141; 336/132; 336/135; 505/850; 505/851
[58] Field of Search ................. 361/19, 58, 141; 323/360; 335/216; 336/132, 134, 135; 505/850, 851, 879, 881

[56] References Cited

U.S. PATENT DOCUMENTS 5,355,275  10/1994  Goodier et al. .................. 361/141

*Primary Examiner*—Jeffrey A. Gaffin
*Assistant Examiner*—Michael J. Sherry
*Attorney, Agent, or Firm*—Ansel M. Schwartz

[57] ABSTRACT

An electrical fault limiter having first, second, third, and fourth magnetic cores. The first magnetic core opposes the second magnetic core and is adjacent to the third magnetic core. The fourth magnetic core opposes the third magnetic core and is adjacent to the second magnetic core. A rotor is disposed between the first and second magnetic cores, and the third and fourth magnetic cores. The rotor is rotatable about a rotor axis. The first and second magnetic cores are disposed on a first side of the rotor axis and the third and fourth magnetic cores are disposed on a second side of the rotor axis. Each core has a first arm, a second arm and a body to which the first and second arms are connected. Each body has a superconduction bias coil disposed about it. Each arm has a conduction mode coil disposed about it. The rotor has a high magnetic reluctance sector and a return flux sector such that when the magnetomotive force from each superconduction bias coil balances with the magnetomotive force from associated load coils on an associated core, there is no force on the rotor. But, when the magnetomotive force from the superconduction bias coil is less than the magnetomotive force from associated load coils on the associated core, then a force is produced on the rotor causing it to accelerate.

20 Claims, 17 Drawing Sheets

Fig. 15a
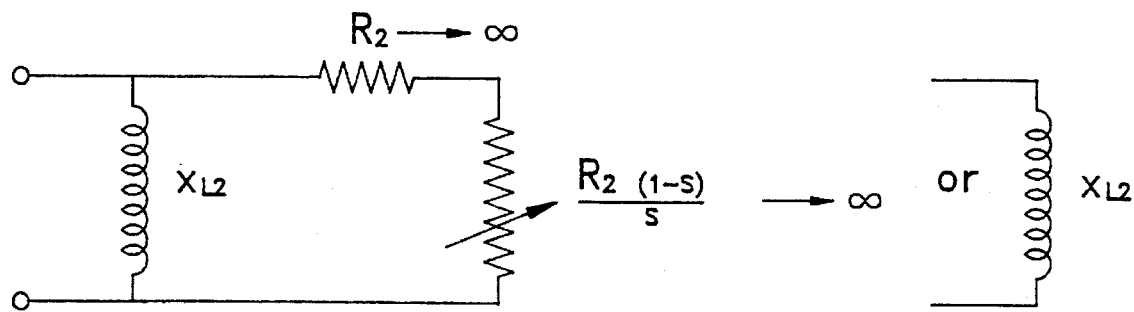
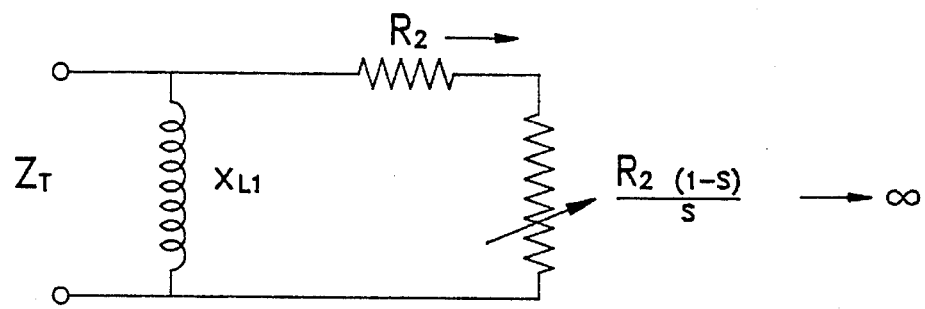
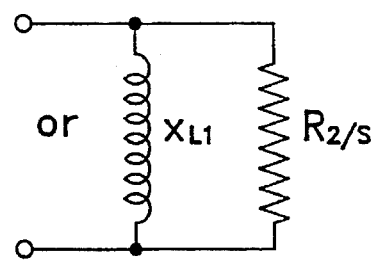
Fig. 15b 5,596,469

1

APPARATUS FOR LIMITING HIGH CURRENT ELECTRICAL FAULTS IN DISTRIBUTION NETWORKS BY USE OF SUPERCONDUCTING EXCITATION IN TRANSVERSE FLUX MAGNETIC CIRCUIT

This application is a continuation of application Ser. No. 08/163,434 filed on Dec. 8, 1993, now abandoned.

FIELD OF THE INVENTION

The present invention pertains to an electrical fault limiter for application to high voltage power distribution networks. More specifically, the present invention pertains to a high current electrical fault limiter that uses superconducting high-field magnet excitation to reduce size and provide serial performance characteristics for speed of response.

BACKGROUND OF THE INVENTION

The prior art in superconductive fault limiters addresses either resistive insertion (R.I.) or inductive insertion (I.I.) into the subject power line with the prior art using devices which are static and rely upon a change in the state of the superconductor from being a zero resistance to a finite resistance component. These systems have a limitation on the maximum current handling capability of the device usually determined by the quench characteristics or maximum allowable AC field imparted upon the superconductor. The response time of these prior-art systems are large and typically exceed one cycle on a 60 Hz waveform or 16.6 ms which reduces the effectiveness of these systems in limiting large power faults.

SUMMARY OF THE INVENTION

The present invention pertains to an electrical fault limiter. The fault limiter comprises a first magnetic core. There is also a second magnetic core opposing the first magnetic core. The fault limiter additionally comprises a third magnetic core adjacent the first magnetic core. Also, there is a fourth magnetic core opposing the third magnetic core and adjacent the second magnetic core. The electrical fault limiter also moreover comprises a rotor disposed between the first and second magnetic cores, and the third and fourth magnetic cores. The rotor is rotatable about a rotor axis. The first and second magnetic cores are disposed on a first side of the rotor axis and the third and fourth magnetic cores are disposed on a second side of the rotor axis. Each core has a first arm, a second arm and a body to which the first and second arms are connected. Each body has a superconduction bias coil disposed about it. Each arm has a conduction mode coil disposed about it. The rotor has a high magnetic reluctance sector and a return flux sector such that when the magnetomotive force from each superconduction bias coil balances with the magnetomotive force from associated load coils on an associated core, there is no force on the rotor. But, when the magnetomotive force from the superconduction bias coil is less than the magnetomotive force from associated load coils on the associated core, then a force is produced on the rotor causing it to accelerate.

BRIEF DESCRIPTION OF THE DRAWINGS

In the accompanying drawings, the preferred embodiment of the invention and preferred methods of practicing the invention are illustrated in which:

2

Figure 1:
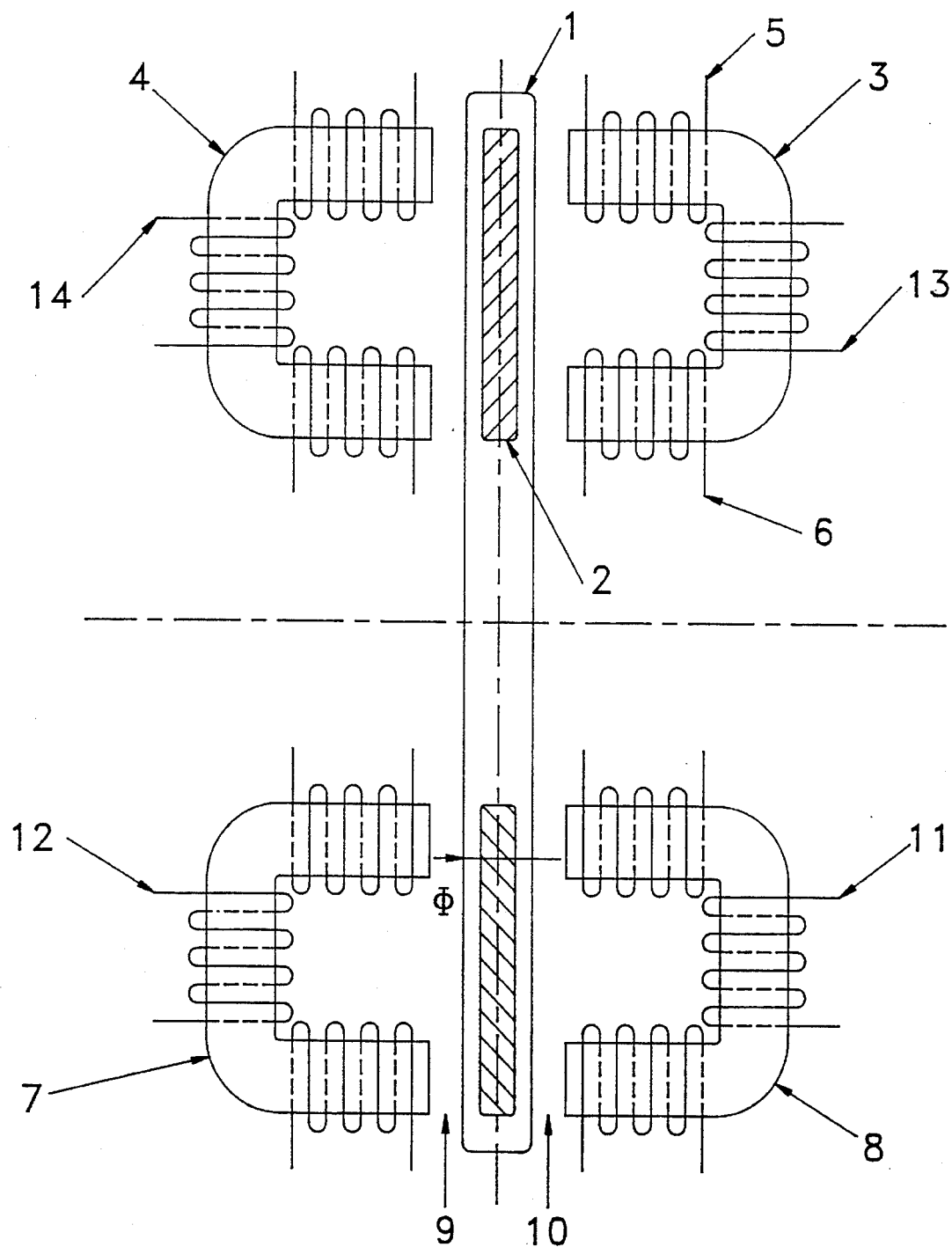

FIG. 1 is a radial-longitudinal cross-section transverse flux current limiter.

Figure 2:
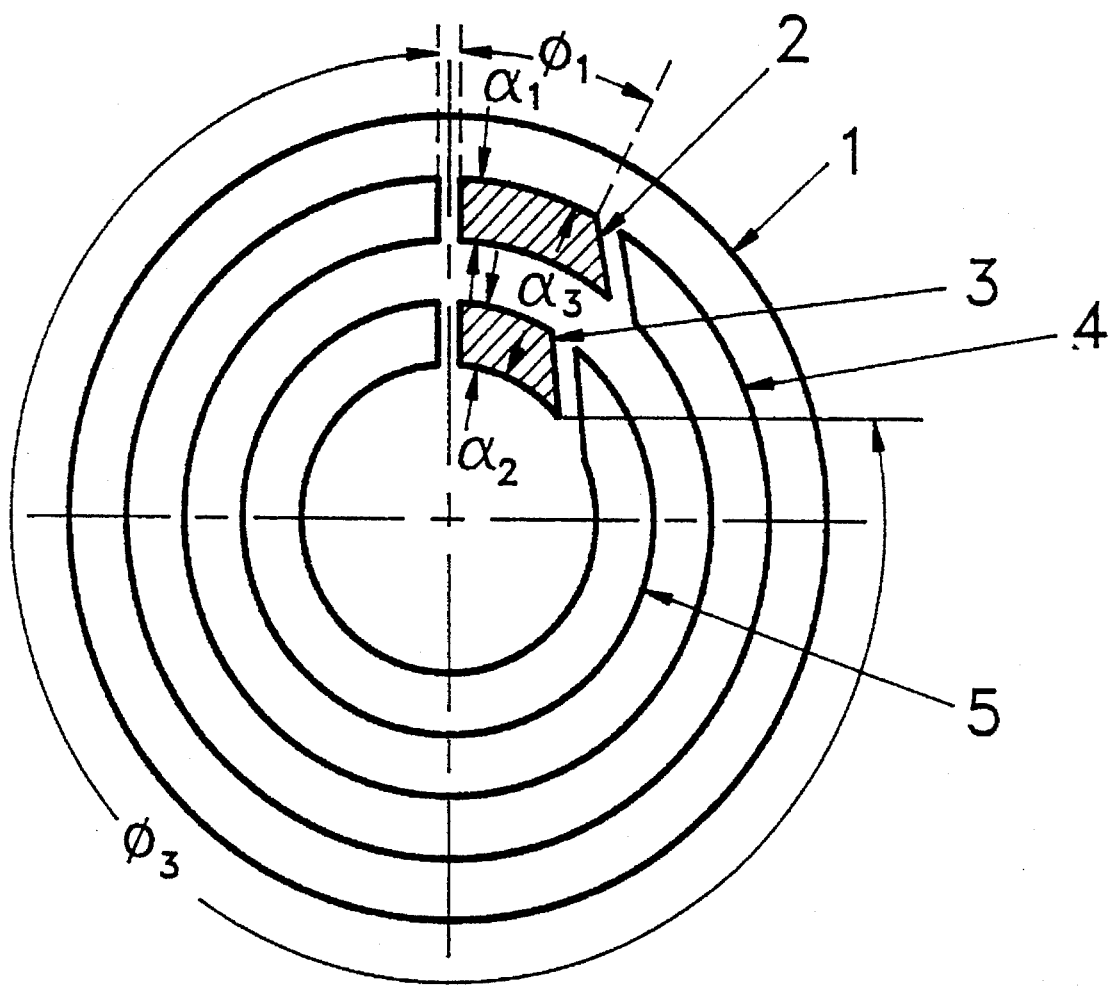

FIG. 2 is a rotor disc layout showing low and high reluctance sounds.

Figure 3:
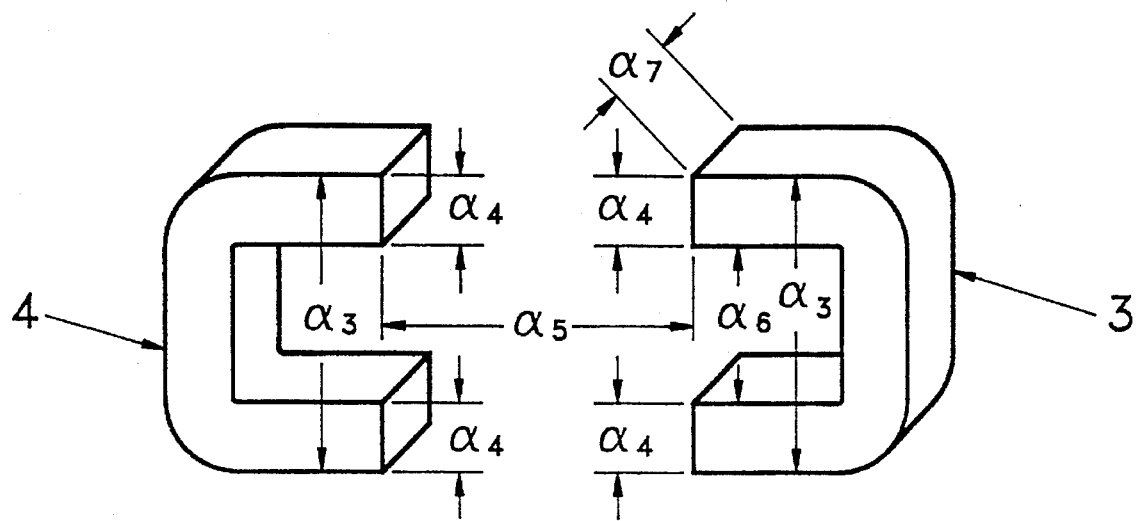

FIG. 3 is a depiction of dimensions of magnetic cores comprising a primary.

Figure 4A:
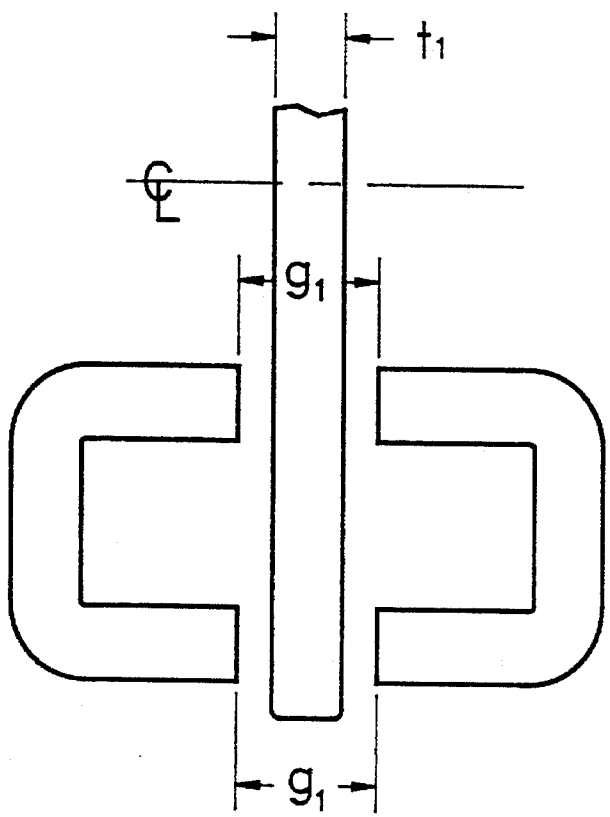
Figure 4B:
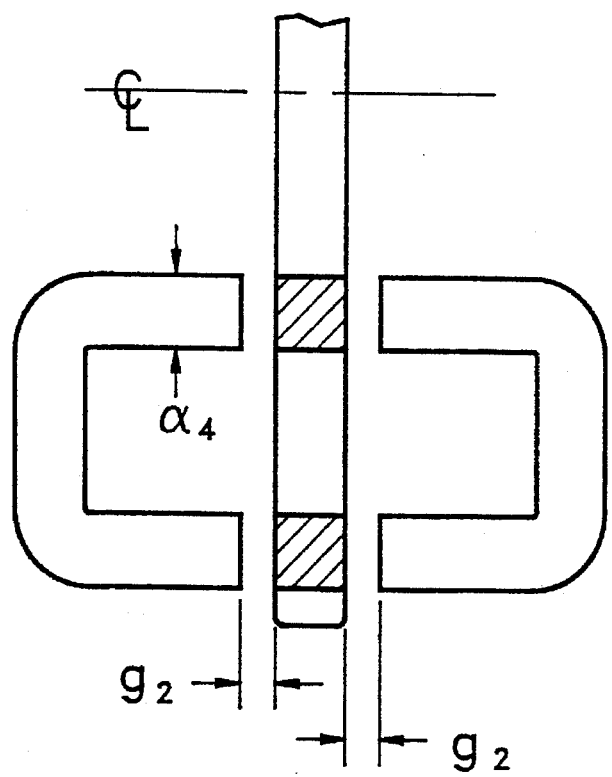

FIGS. 4a and 4b are relative differences in magnetic gap between disc sector and off-state and on-state, respectively.

Figure 4C:
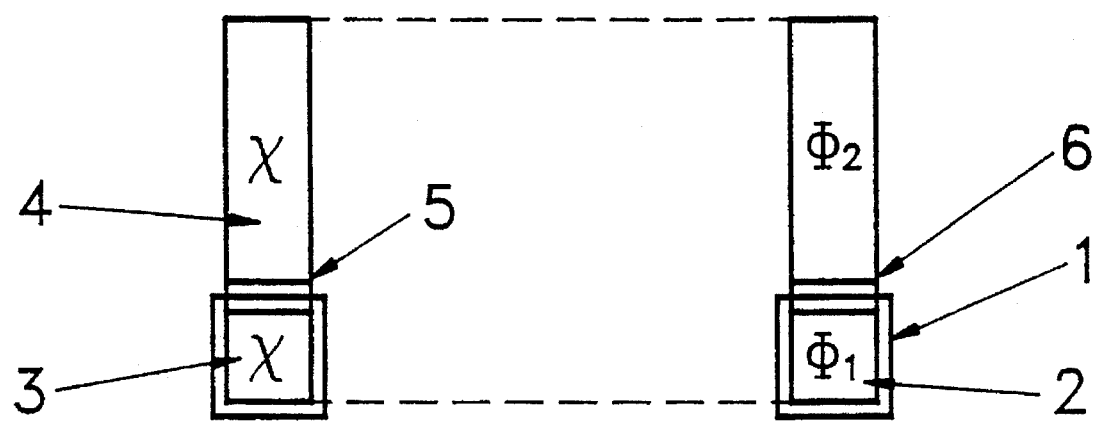

FIG. 4c is a representation of the magnetic core showing location of shading ring in each pole face to initiate traveling wave action.

Figure 5:
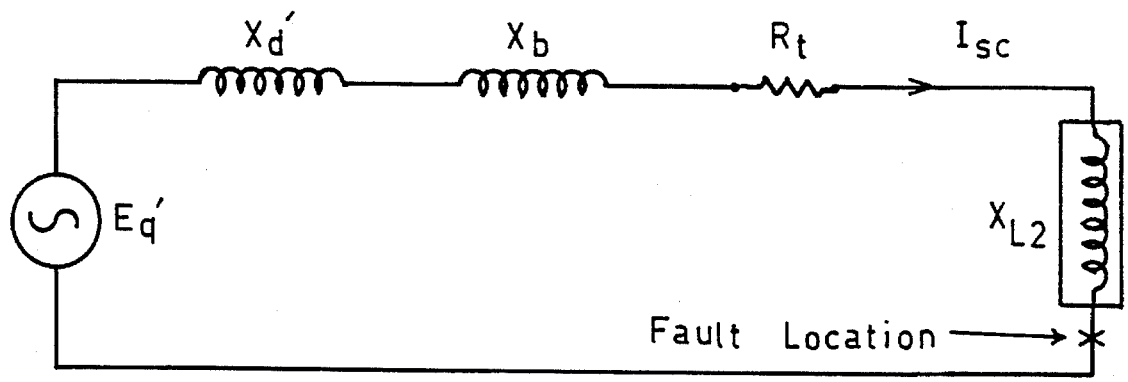

FIG. 5 is a single-phase equivalent circuit of network with fault limiter shown immediately ahead of distribution line line-to-neutral fault.

Figure 6:
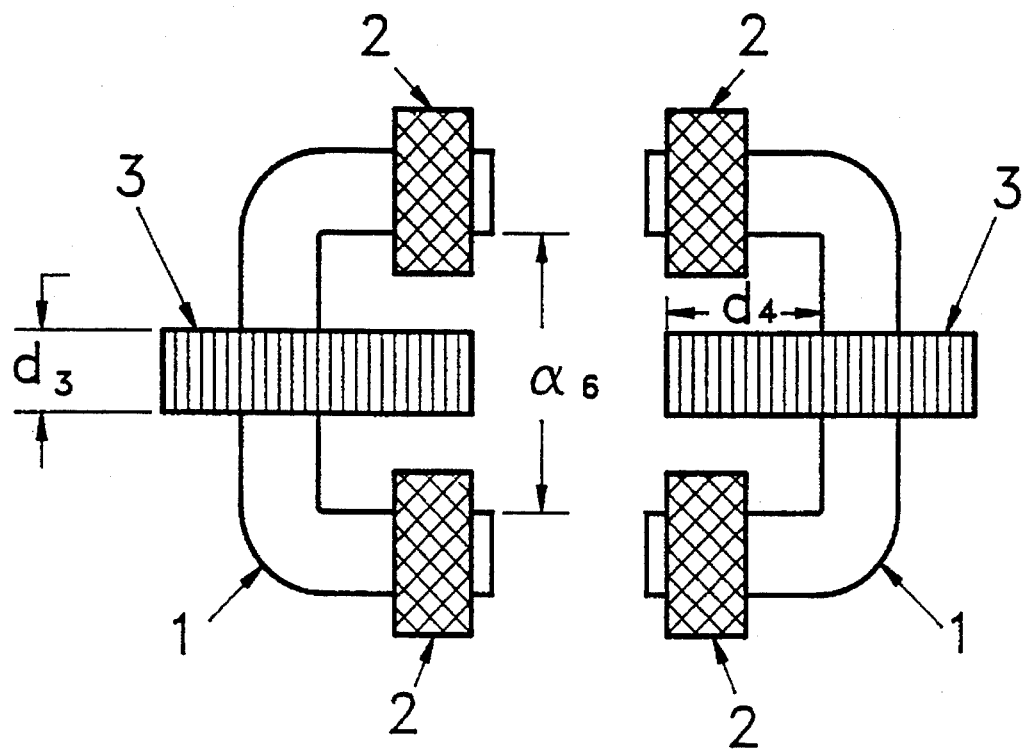

FIG. 6 is a representation of the location of tertiary or superconducting bias coils for offset of core flux.

Figure 7:
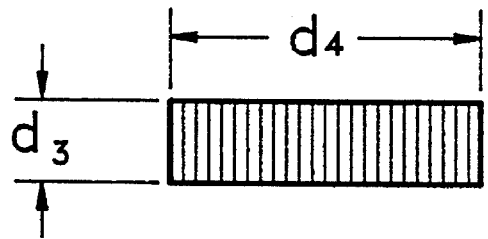

FIG. 7 shows a cross-section of superconducting bias coil in preferred embodiment.

Figure 8:
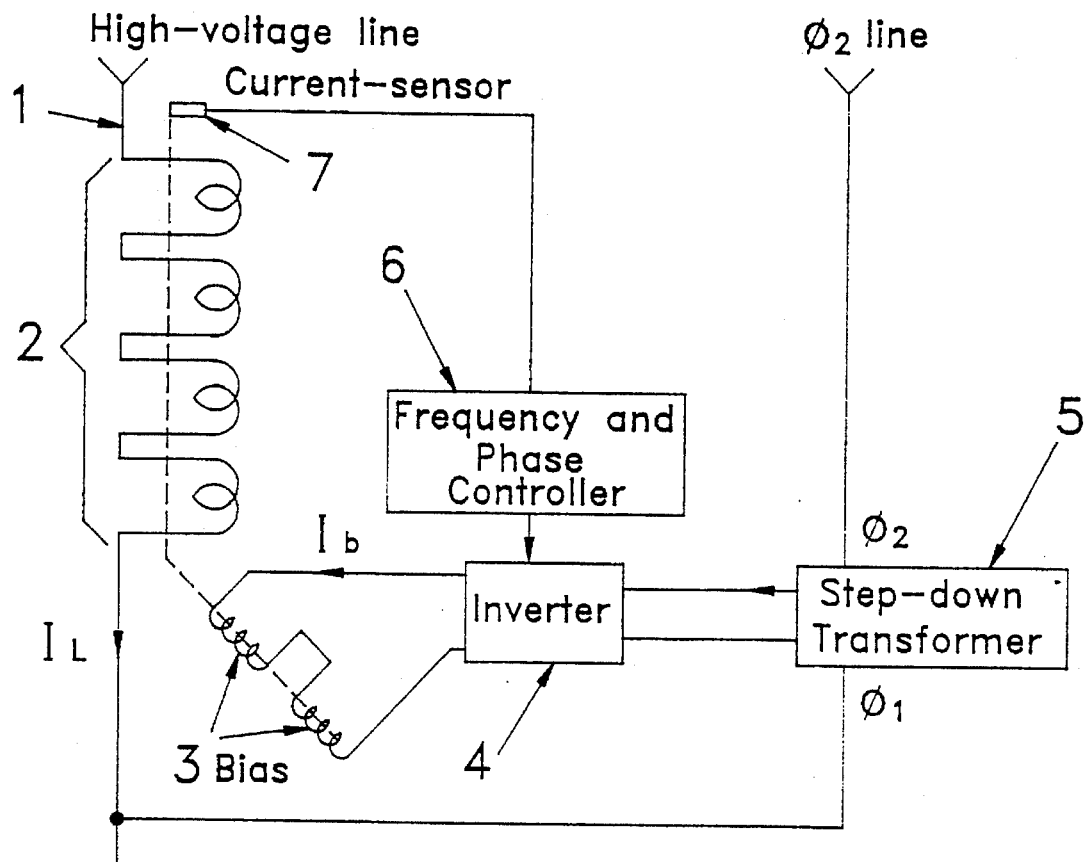

FIG. 8 shows an equivalent circuit for the connection of primary and tertiary coils in a preferred embodiment.

Figure 9:
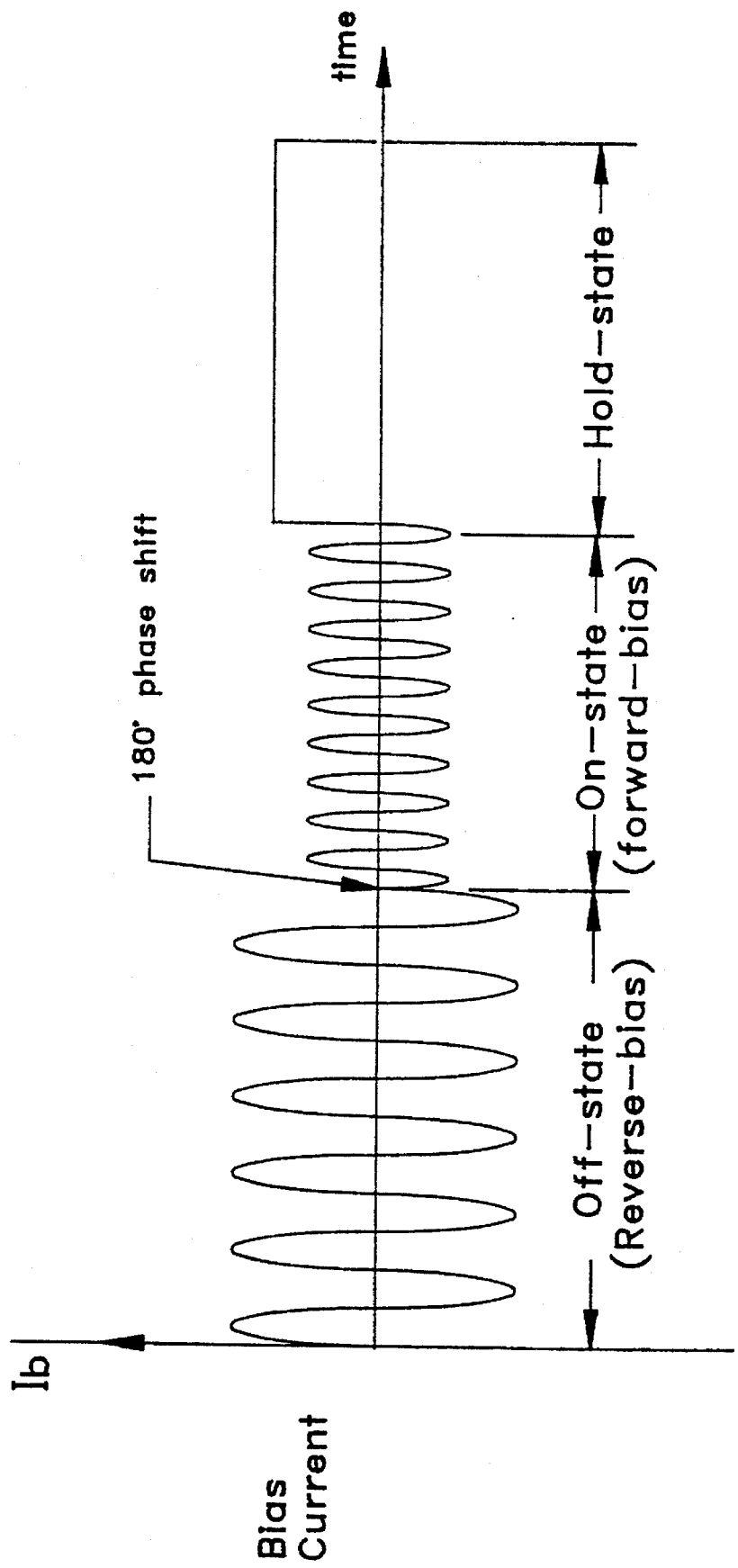

FIG. 9 shows the modes of operation for the bias current using both AC and DC.

Figure 10:
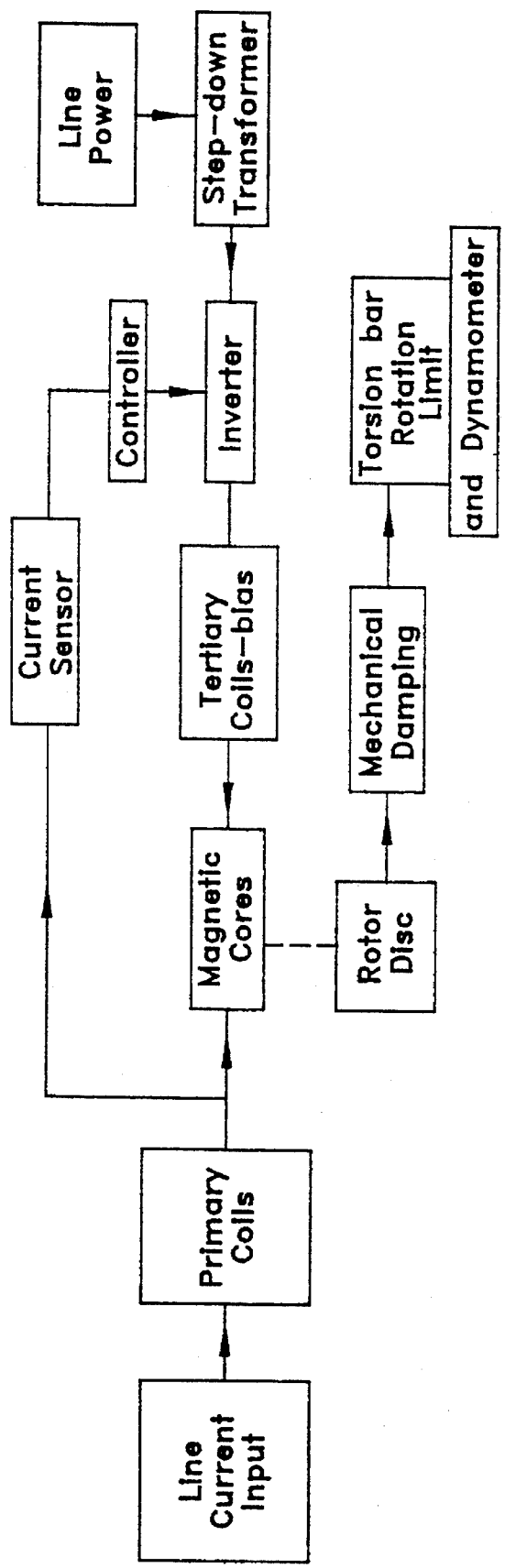

FIG. 10 is a block diagram of a preferred embodiment of a fault limiter with master control scheme.

Figure 11:
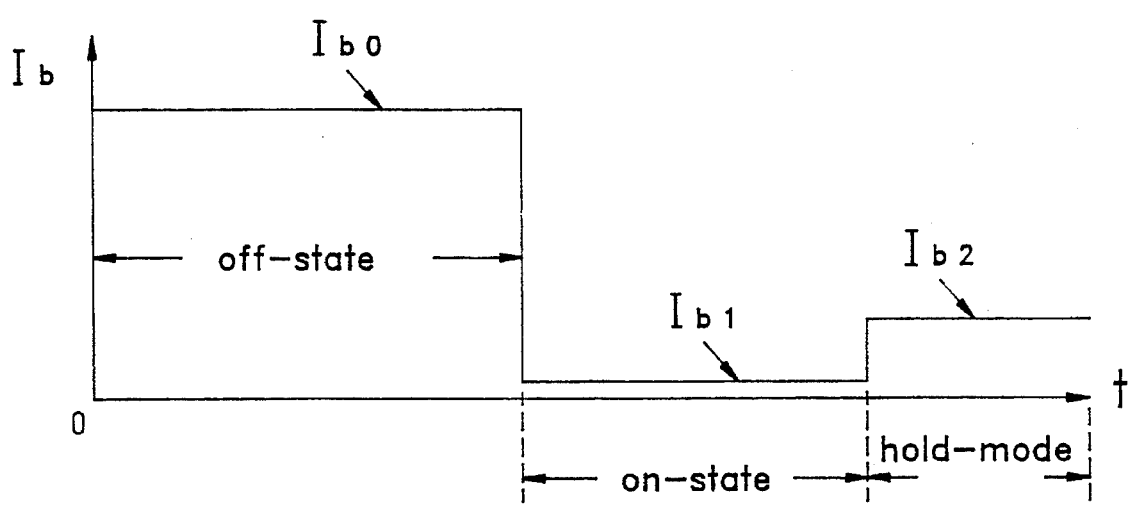

FIG. 11 shows the bias current fault limiter using DC.

Figure 12:
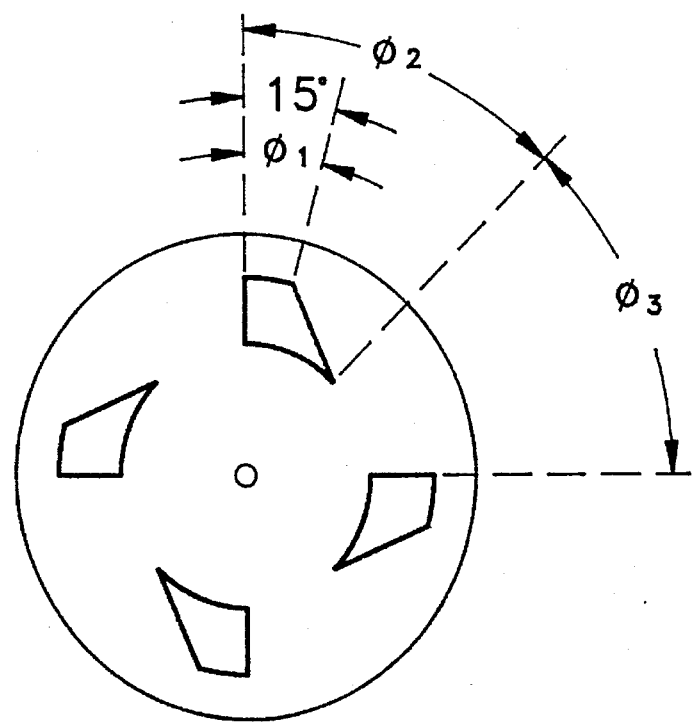

FIG. 12 shows a cross-section of the rotor disc where n=4 poles.

Figure 13:
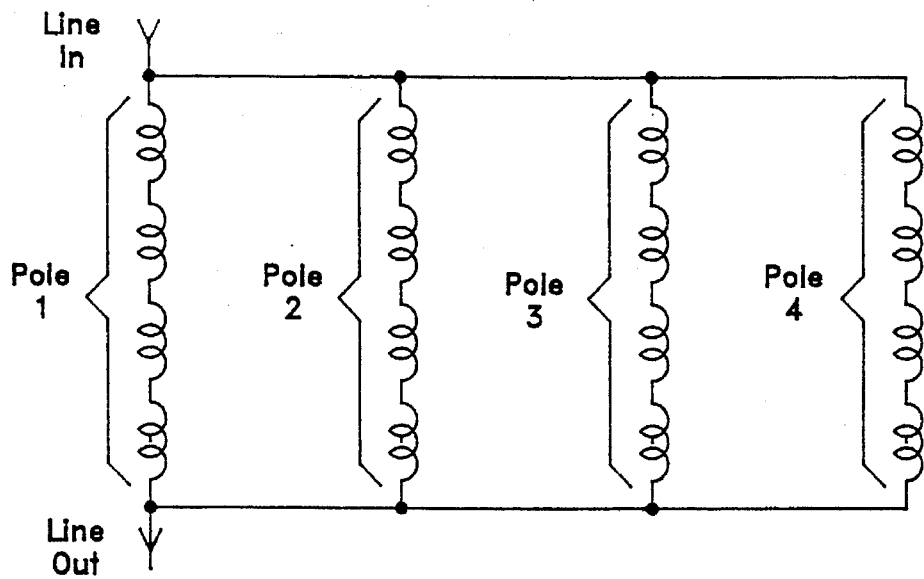

FIG. 13 shows a connection diagram where n=4 in the fault limiter.

Figure 14:
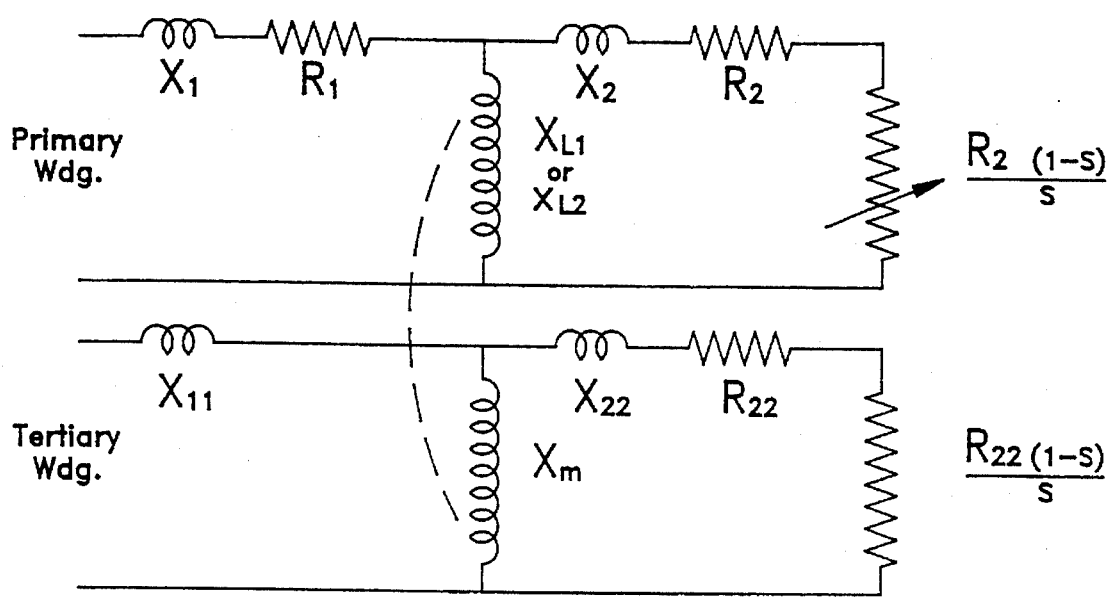

FIG. 14 shows the equivalent circuit for the transverse flux fault limiter with superconducting excitation.

FIG. 15a shows the on-state simplified equivalent circuit.

FIG. 15b shows the off-state simplified equivalent circuit.

Figure 16:
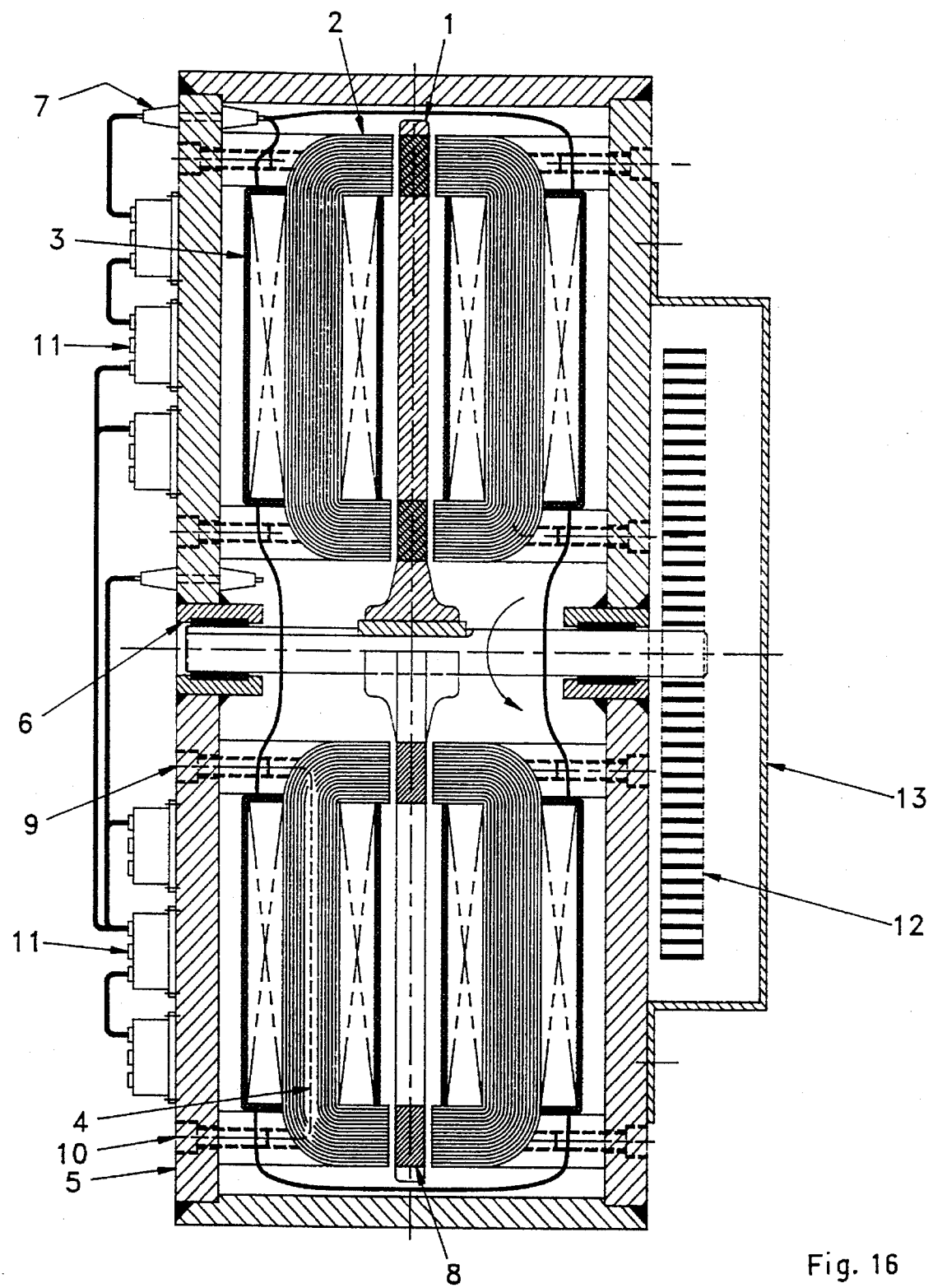

FIG. 16 shows a first type of superconducting fault limiter.

Figure 17:
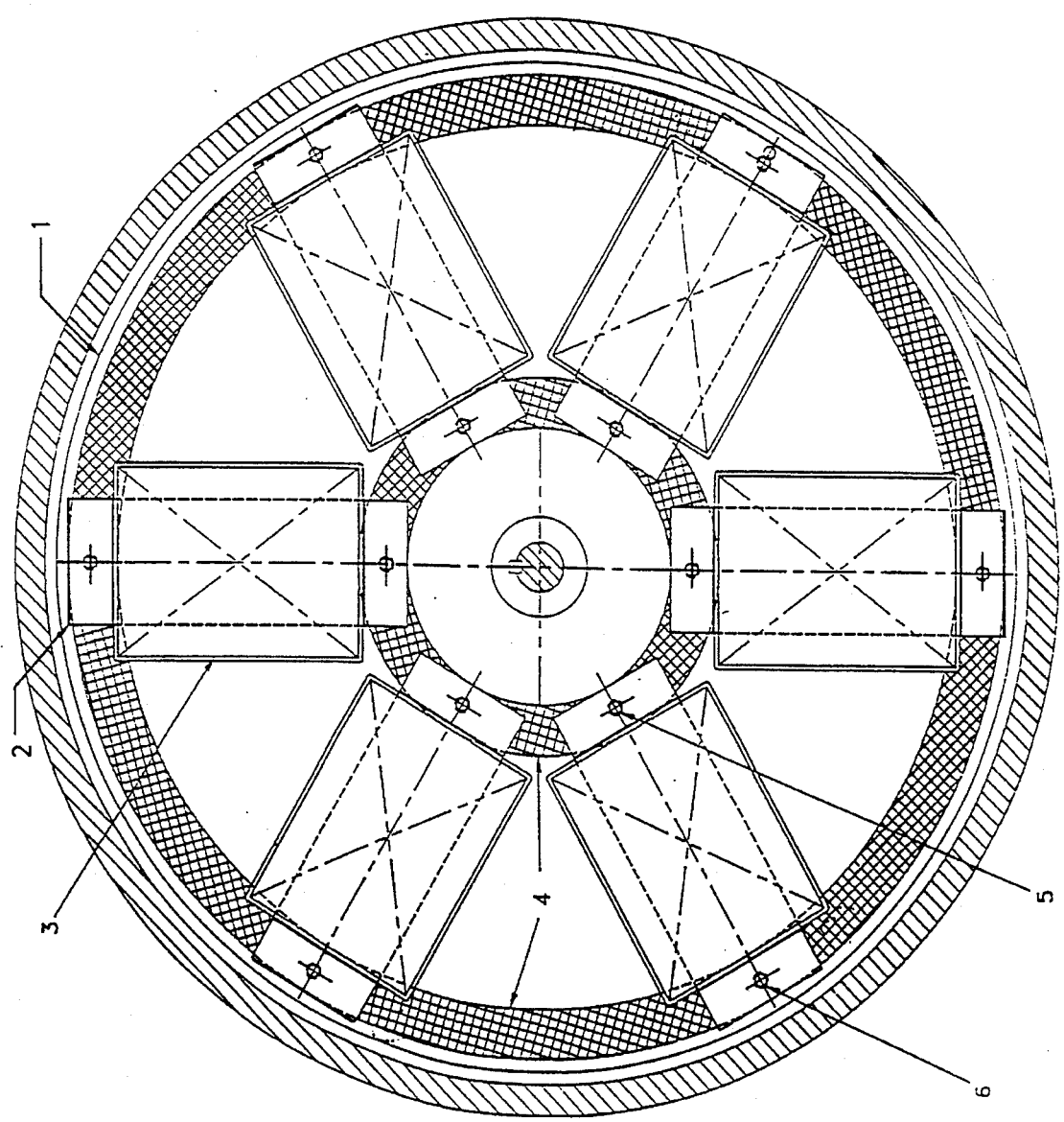

FIG. 17 shows an embodiment of a superconducting fault limiter.

Figure 18:
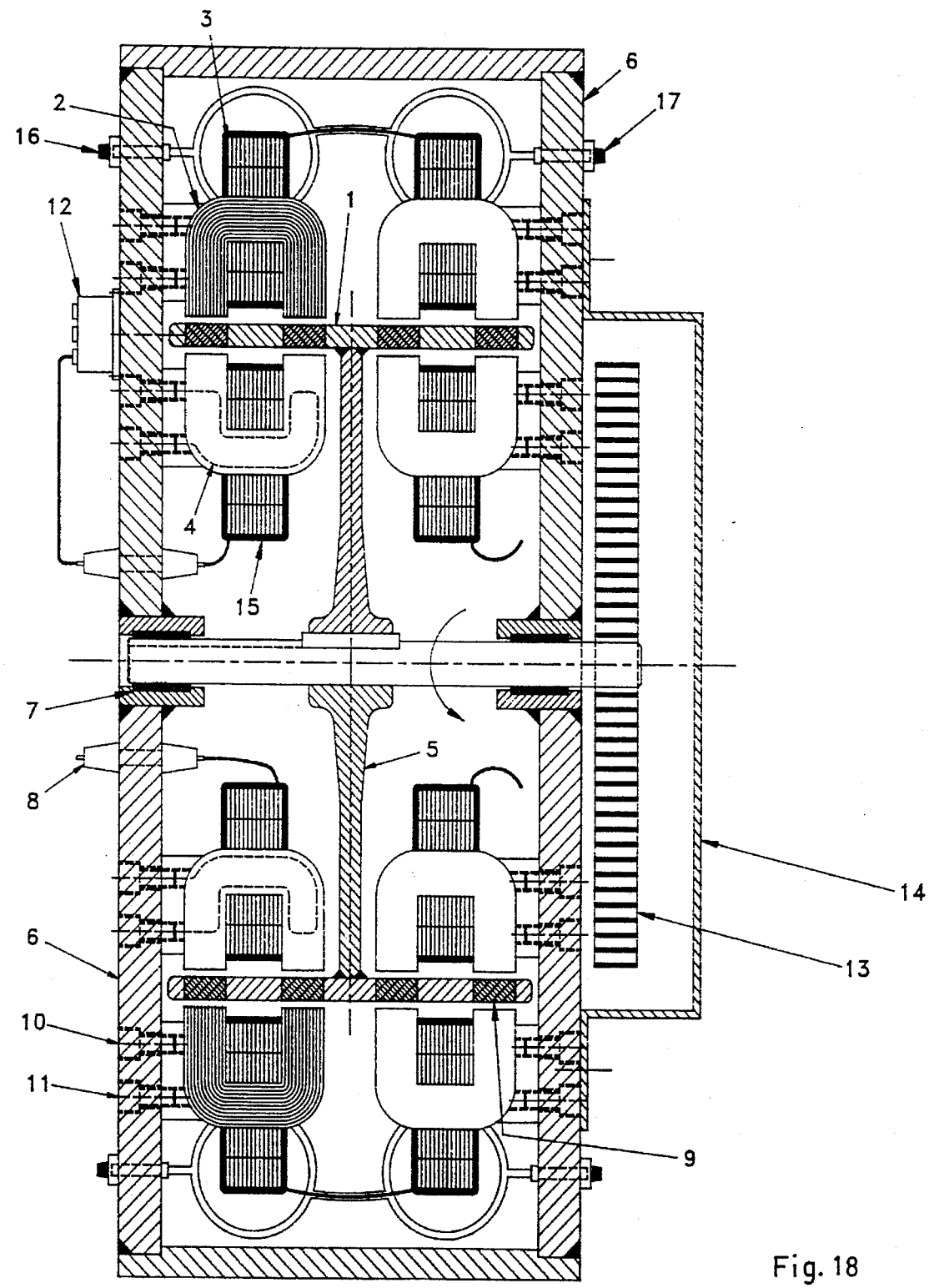

FIG. 18 shows an alternative embodiment of a superconducting fault limiter.

DESCRIPTION OF THE PREFERRED EMBODIMENT

Referring now to the drawings wherein like reference numerals refer to similar or identical parts throughout the several views, and more specifically to FIG. 1 thereof, there is shown a radial-longitudinal cross-section of an electrical fault limiter. The fault limiter comprises a first magnetic core 4. There is a second magnetic core 3 opposing the first magnetic core 4. There is a third magnetic core 12 adjacent the first magnetic core 4. Additionally, there is a fourth magnetic core 11 opposing the third magnetic core 12 and adjacent to second magnetic core 3. There is a rotor 1 disposed between the first and second magnetic cores 4, 3; and the third and fourth magnetic cores 12, 11. The rotor 1 is rotatable about a rotor axis 21. The first and second magnetic cores 4, 3 are disposed on a first side 23 of the rotor axis 21 and the third and fourth magnetic cores 12, 11 are disposed on a second side 25 of the rotor axis 21. Each core has a first arm 33, a second arm 35 and a body 37 to which the first and second arms 33, 35 are connected. Each body 37 has a superconduction bias coil (14 on the first core 4), each arm has a conduction load coil 5, 6 disposed about it.

The rotor has a high magnetic reluctance zone 2 and a return flux sector 3 as shown in FIG. 2 such that when the magnetomotive force from each superconductor bias coil balances with the magnetomotive force from associated load coils on an associated core, there is no force on the rotor 1, but when the magnetomotive force from the superconduction bias coil is less than the magnetomotive force from associated load coils on the associated core, then a force is produced on the rotor 1 causing it to accelerate. Preferably, the conduction load coils are superconduction load coils.

The described invention makes use of both high-field (4–8 Tesla) and medium field (2–4 Tesla) superconductors in a high current fault limiter without the effect of armature or load-current reaction which otherwise would eliminate the maximum current carrying ability of the present invention. The need to limit overload or fault current in high-voltage electrical distribution systems is dependent on the following 5 parameters for production of a commercially-viable device:

1. Ability to initiate principal current limiting action in a sub-cycle basis such as quarter-cycle response time (e.g. 4.15 ms on a 60 Hz waveform).
2. Ability to reset fault-limiter by electronic or solid-state means in a sub-cycle basis (e.g. 1 ms) to prepare subject device for next fault limiting action which may occur within several cycles of initial fault.
3. Ability of subject device to "hold and latch" in the fault limiting mode for extended periods of time in high impedance mode without degradation of high voltage blocking capability on a high-voltage distribution network, of typically line to line voltage 7.2 kV–38 kV.
4. Ability to change overall device impedance which is substantially inductive reactance in series insertion mode by a minimum factor of 60:1 in the above described operating period (e.g. ¼ cycle) with no substantial introduction of series or shunt resistance so as to limit or curtail all dissipative losses of the subject device.
5. The series impedance of the present invention when in the non-limiting or off-mode is to be a minimum for both series R and series $X_L$ components so that the normal steady-state losses are negligible compared to other system power losses. The off-state mode has both inductive losses calculated as $Q=I^2X_L$ and resistive losses calculated as $P=I^2R$. The overall off-state apparent power loss is calculated as $S=\sqrt{P^2+Q^2}$ The present invention as shown in FIG. 1 makes specific use of a rapid-change in series inductive reactance by the rotary arc movement of a low inertia disc rotor in a 360° or less arc using transverse-flux inductive coupling of the primary and secondary electrical members. The primary electrical member is a series of ferromagnetic and laminated cores or pole-pieces 3, 4, 7, and 8 to form a multipolar excitation structures arranged in either a 360° or smaller angle array surrounding the disc rotor secondary electrical member 1, 2 with identical or similar primary cores on both sides of the disc rotor secondary electrical member. Each primary core has a flux path which is transverse and crosses an airgap 9 between the core 7 and disc rotor secondary electrical member 1, said flux penetrating the entire disc and crossing the second airgap 10 to reach the opposing set of ferromagnetic cores 8 composing the remaining half of the primary member.

Primary excitation windings 5, 6 are connected to the AC bus circuit requiring fault limiting in a series injection mode. Main windings 5 and 6 may be connected in either series or parallel from the same core depending on "off-state" impedance desired, and are subject to the full electromagnetic forces developed under fault current conditions. When the current in winding 5 or 6 exceeds a threshold current $I_T$ the resulting electrodynamic action between primary member and secondary electrical member causes the secondary conductor to rotate due to the induced currents in the disc rotor and the consequent induction motor action. The disc rotor secondary electrical member 1 disc is composed of an electrically conductive material such as copper which should not be ferromagnetic and mounted on a shaft capable of transmitting torque T to a reaction bar or torsion spring to limit the arc movement to either 360° or a definite multiple of 360° rotation. The important distinction of the present invention is the exact composition of the rotor disc which is isotropic and aside from the base conducting material, each disc rotary secondary electrical member 2 has a ferromagnetic insert which eventually is moved into a spatial rotor position by induction-repulsion action causing a rapid change in reflected impedance in the primary winding coils, 5, 6. It is this change in reflected coil impedance which appears at the distribution line. The following analysis shows how a 60:1 change in steady-state inductive reactance is practical using the described geometry and a transverse flux magnetic orientation.

The uniqueness of the approach resides in the magnetic circuit which necessarily relies on transverse flux field orientation to insure that there is only positive reaction torque on the disc, i.e., during both negative and positive swings of the AC fault current cycle the disc travel is absolutely limited to move in one direction only without exception. The present invention also includes a corresponding solid-state latching mechanism to hold the disc in a fixed position for maximum magnetic reluctance once the fault has occurred. This latching mechanism preferably uses superconducting excitation and is resettable upon external command. The rapid and controllable change in overall magnetic reluctance of the device is described in terms of magnetic equivalent circuits and ferromagnetic cores of the "C" type construction arranged in a multipolar structure.

FIG. 2 shows a basic zoned-rotor disc 1 which comprises: A high magnetic reluctance sector 2 of radial dimension $\alpha_1$ forms the secondary during the off-state operation. i.e. prior to fault limiting. The reluctance sector 2 is a conducting solid medium such as copper or aluminum but non-ferromagnetic. The return flux sector 3 has dimension $\alpha_2=\alpha_1$ or $\alpha_2 \approx \alpha_1$ as the same amount of flux has to pass through reluctance sector 2 as return flux sector 3. The dimension $\alpha_1$ or $\alpha_2$ has to approximately equal to the radial core dimension $\alpha_4$ of the primary cores, as shown in FIG. 3, for optimum use of materials. Dimension $\alpha_3$ shown in FIG. 3 is the overall radial height of the primary cores and corresponds to the dimension $\alpha_3$ shown in FIG. 2. The high reluctance sector is limited to rotor angle $\theta_1$ for the outer edge and limited to angle $\theta_2$ at the inward edge of Item 2 of FIG. 2. The other crucial parameter is the effective airgap $2\times\alpha_5$ for the case when high magnetic reluctance sector 2 and return flux sector 3 is between the primary cores. Dimension $\alpha_5$ is chosen to be relatively large e.g. 3 cm but in general its dimension must be chosen based upon a field plot or reluctance calculation taking into account dimension $\alpha_6$, the spacing between inner edges of one primary C-core. In general, it is a design criterion that for high magnetic reluctance $\alpha_5 > \alpha_6$ In the on-state or after the rotor disc has electrodynamically moved at least sector angle $\theta_1$, the new rotor material between C-cores 3, 4 is a low reluctance material and highly ferromagnetic such as Hiperco 50 steel which has a 50% cobalt content and a high saturation density such as 2.4 Tesla. The dimensioning of the airgap with the ferromagnetic zone 3, 4 is shown in FIG. 4b. The mechanical airgap per side is $g_2$ and thus the total magnetic gap is $4g_2$. Gap $g_2$ is sized to be as small as mechanical tolerances permit with the stiffness of rotor disc taken into consideration. A typical value for this gap is $g_2$=0.5 mm. FIG. 4c shows the preferred mechanism for causing disc rotation with a single-phase excitation source and independent of the tertiary coil. A highly conductive closed loop (1) surrounds portion (2) of magnetic core face causing a phase shift in magnetic flux between $\Phi_1$ and $\Phi_2$ to occur, producing a traveling magnetic field sufficient to accelerate the rotor disc by induction-repulsion action. The disc accelerating force is proportional to $I^2$. The area of pole face 3 should not be equal to the area of pole face 4 but significantly smaller than pole face 4. The shading rings are preferably located as close to the airgap as possible with slots 5, 6 cut to accommodate the shaded-ring conductors.

The magnetic reluctance of the off-state (termed Mode 1) is approximately $$R_1 = \frac{l_1}{\mu_o A} = \frac{4g_2}{\alpha_4 \cdot \alpha_7}$$

where $l$ is the transverse gap and $A$ is the pole face area, $\mu_o$ is the permeability of free space. In the on-state or fault limiting, the reluctance is now $$R_2 = \frac{l_2}{\mu_o A} = \frac{4g_2}{\mu_o \alpha_4 \cdot \alpha_7}$$

The ratio of the reflected inductance $L_1/L_2$ is the ratio of the inverse of the magnetic reluctances as $$\frac{L_1}{L_2} = \frac{N^2/R_1}{N^2/R_2} = \frac{R_2}{R_1}$$

where N is the total number of turns per set of C-cores per phase. If typical design values are used:

$g_1$=6.0 cm
$g_2$=0.5 mm
$T_1$=disc thickness=5.9 cm

Then the reluctance ratio is $$\frac{R_1}{R_2} = \frac{2g_1}{4g_2} = \frac{12.0 \text{ cm}}{0.2 \text{ cm}} = 60:1$$

and consequently the inductive reactance ratio is $$\frac{X_{L2}}{X_{L1}} = 60$$

where $X_{L2}$ is the inductive reactance in the ON-state, i.e. in fault limiting mode and $X_{L1}$ is the reactance in the OFF-state or quiescent state prior to fault occurring. The short-circuit current $I_{sc}$ is determined by the total loop short circuit impedance, $Z_T$ from the generator source $E_q'$ in the transient mode, i.e.

$$I_{sc} = \frac{E_q'}{Z_T}$$

where $$Z_T = \sqrt{(X_d' + X_b + X_{L2})^2 + R_T^2}$$

where $X_d'$=generator short-circuit reactance $X_b$=bus-bar or line impedance between generator & short-circuit.

$R_T$=Total loop circuit resistance

The significance of a high $X_{L2}$ value is that the inequality holds $$X_{L2} \gg X_b \gg X_d' \gg R_T$$

and therefore the total circuit impedance is dominated by the value of $X_{L2}$ or $$Z_T \approx X_{L2}$$

FIG. 5 shows an equivalent circuit of the network. In the off-state it is essential that $X_{L1}$ is negligible and less than other circuit reactances or $$X_{L1} < X_b < X_d'$$

The numerical values of $X_{L1}$ and $X_{L2}$ may be determined from typical power system values for generator and line reactance as follows:

$X_d'$=0.23 per unit $X_b$=0.07 per unit

By way of example if $X_{L1}$=0.02 per unit by suitable choice of winding dimensions and turns, then $X_{L2}$=60 (0.02)=1.20 per unit. To convert to ohmic values, a 20 MVA base rating is chosen at a 14.4 kV level; the base impedance is determined as $$Z_b = \frac{E_{LN}^2}{S/3} = \frac{(8,314)^2}{(20 \times 10^6)/3} = 10.36 \text{ ohms}$$

Therefore, on a 60 Hz basis:

$X_{L1}$=0.02 (10.36)=0.208 ohms or $L_1$=0.552 mH $X_{L2}$=1.2 (10.36)=12.44 ohms or $L_2$=33 mH The present invention is now described in terms of a working prototype built to demonstrate the concept. The dimensions of key parameters are:

For On-state Parameters $g_2$=0.50 mm $\alpha_4$=25.4 mm $\alpha_7$=50.8 mm

Pole area=$\alpha_4 \cdot \alpha_7$=1290 sq. mm.

$$\therefore R_2 = \frac{4(0.50)}{(1290 \text{ sq. mm.}) 4\pi \times 10^{-7} H/m} = 1.233 \times 10^6$$

Therefore the primary turns on the 2 "C-cores" is $$N = \sqrt{L_2 \cdot R_2} = \sqrt{33 \times 10^{-3} (1.233 \times 10^6)}$$
$$= 201.7 \text{ turns}$$

This total number of turns is distributed into 4 identical coils of 50.5 turns each arranged as two on each C-core in the preferred embodiment. Clearly for other distribution levels than 14.4 kV, the number of turns will be altered to yield the appropriate impedance level. In the preferred embodiment, the described apparatus is appropriate for both single-phase and three-phase fault limiters with operations in voltage and current not to exceed the design rating. The fault current prior to limiting is for the model power system.

Let $E_q' = 8314$ Volts $$Z_T = \sqrt{(0.23 + 0.07 + .02)^2 + (.015)^2}$$
$$= \sqrt{0.32^2 + .015^2} = 0.32 \text{ per unit}$$
$$= 3.319 \text{ ohms at 60 Hz}$$

The fault current is thus initially on a 600 A rated line $$I_{sc} = \frac{8314 \text{ V}}{3.319 \text{ }\Omega} = 2505 \text{ Amps } rms \text{ or } 4.2 \text{ per unit}$$

In a response time of 4 ms, the total circuit impedance is changed to $$Z_T = \sqrt{(0.23 + 0.07 + 1.2)^2 + (.015)^2}$$
$$= 1.50 \text{ per unit} = 15.54 \text{ ohms}$$

and $I_{sc} = \pm b \frac{8314 \text{ V}}{15.54 \Omega} = 535$ Amps rms or 0.89 per unit, by way of example.

thus limiting fault current to below nominal line rating.

The following now describes the specific apparatus involving the superconducting coils which realize a controllable or adjustable fault limiter. A tertiary electrical winding must be fitted to each primary magnetic core to buck or boost the ampere turns provided by the primary electrical winding connected in series with the utility grid or load since the primary winding will at nominal current otherwise start the rotor disc into movement prior to fault, which is undesirable. Consequently, the primary magnetic cores must be biased or contain bucking ampere-turns which are present up until the instant of the fault and subsequently removed. To minimize heat loss in this extended period of time, the tertiary bias coil may be superconducting with negligible real power dissipation and wound in the preferred embodiment in the interpolar space, sandwiched between the two grid-excited primary coils. FIG. 6 shows one arrangement of the transverse flux magnetic cores 1 with 4 sets of primary coils 2 and two sets of tertiary, superconducting coils 3 per set of magnetic cores.

From the previous example of the prototype fault limiter, each set of cores contains 202 turns and thus at a nominal line current of 600 Amps, the base magnetomotive force excitation is 121.2 kAT. Therefore, the bias coils need to have at least a rating of 150% of this or 182 kAT per set of cores or 91 kAT per side. With the dimensions chosen in the prototype, let bias coil height $d_3=0.65$ ($\alpha_6$)=0.65 (75 mm)= 48 mm and depth=90 mm, total a window area of 4.56 sq. cm. With a typical SC current density for niobium-titanium wire at 19,956 A/sq. cm., the described bias coil carries 4.56×19,956=91,000 Amps-turns. The impedance level of said bias coil is not a crucial parameter and may be conveniently chosen to be greater than the impedance of the primary or series injection coils due to the separate shunt excitation of the bias coils. The baseline bias coil in the prototype has a nominal current of 47 Amps and consequently 91,000/47=1936 turns are required per C-core.

FIG. 8 shows an equivalent circuit for the connection of primary and tertiary coils in the preferred embodiment. Primary coils 2 are inserted in high voltage line 1. Bias coils 3 are energized by variable-frequency inverter 4 fed by step down transformer 5 and frequency/phase controller 6 receiving input from current sensor 7. The bias coils are operated in an AC mode normally at the same frequency as the line voltage but with the option of having the electronic inverter control the amount of asymmetrical component of current or DC offset fed to the bias coils to insure control of the magnetic core characteristics under both symmetrical and asymmetrical short-circuit conditions. In the off-state, bias current $I_b$ as shown in FIG. 8 feeds bias coils of total excitation equal to the primary excitation produced by current $I_L$ form line. The net flux is zero in the airgap and consequently the rotor disc remains stationary.

When a fault is detected by the rate of change of current $I_L$ at a di/dt value equal to or exceeding a controller present value DI*, the reverse bias is abruptly dropped, $I_b=0$ and the full value of $I_L$ is used to provide repulsion-induction torque on the rotor disc to effect the rapid change in magnetic reluctance. The disc must rotate through angle $\theta_1$ in one-quarter cycle and produces the consequent low reluctance characteristic prior to when the drop off in line current is insufficient to induce heavy propulsive currents in the disc. In this event, the bias coil may be biased forward in the AC mode to assist the primary coil in accelerating the rotor. After the angle $\theta_1$ is attained, the inverter 4 changes into a rectifier mode to provide a high-current DC output for which to magnetically hold the rotor disc in a fixed on-state position and retain the low reluctance position. FIG. 9 shows the three different modes of the bias coil assembly through a typical short circuit. When the system controller decides to restore power or remove the fault limiting function, the DC bias is removed and $I_b$ is again excited in reverse AC bias mode causing disc to reverse rotation and return to $\theta=0$ position with high reluctance mode.

The preferred embodiment includes mechanical damping such as a viscous fluid damper of the rotor disc to limit angular acceleration in both directions and inclusion of a torsion-bar on the main rotor shaft such the overall apparatus is able to absorb a portion of the fault energy in the mechanical tensioning of the torsion bar. Both mechanical subsystems act in a fashion to limit the maximum angular rotation of the rotor disc to a value less than 360° and also provide a calibrated means by which to measure the intensity of the fault by the magnitude of the angular displacement of the attached torsion bar. FIG. 10 shows the major subsystems.

The preferred embodiment makes use of superconductors operating with alternating current to effectively control core saturation, etc. However one further embodiment is covered which makes better utilization of the SC wire by allowing either a higher $T_c$ or higher $J_c$ then the equivalent AC operated SC wire. Referring to FIG. 8, pole face 4 may also be an AC to DC converter providing variable DC current to the bias winding of single polarity and insuring that no rotating or traveling magnetic fields are established which would cause disc rotation. FIG. 11 shows a waveform of bias current whereby only DC is applied to the magnetic core bias coil. Level $I_{bo}$ is equal to the peak value of the AC current waveform and $I_{b2}$ is less than 10% of $I_{bo}$, for the hold or latching current. This scheme does not have the ability to electrically retract the disc when only DC is present but relies on use of a mechanical torsion bar or spring assembly to provide reverse torque to return to the start position.

In the simplest embodiment of the invention, the tertiary bias coils would be fed exactly at line frequency with only a modulating or phase-back thyristor controlling the magnitude of bias current but without possibility of controlling phase angle of the bias coil. This is a feasible arrangement for economic or low-cost installations.

This embodiment has certain applicable range of fault limiting operation and must contain an electronic control system to predict the maximum short-circuit characteristic to melt system constraints for adjustable $I^2T$ and asymmetrical/symmetrical current triggering.

The preferred embodiment has a multiplicity of the magnetic cores spaced around the inner periphery of the disc to form a multipolar fault limiter with "n" identical poles per periphery, providing a higher power density structure. The on-state angle $\theta_3$ is limited to under $360/n-\theta_1$ degrees and for example if $\theta_1=15°$, n=4, then $\theta_3 \leq 75°$. It is also imperative then $\theta_3 > \theta_1$ where $\theta_1$ is set by magnetic design of the minimum possible magnetic pole area to carry the appreciable flux generated in short-circuit modes. FIG. 12 shows a multipolar disc where n=4 and there are non-ferromagnetic, highly conductive disc inserts shown by way of example with a 15° arc and ferromagnetic sector 5 may be arranged to form the principle mechanical support for the conductive inserts. The limiting factor in selection of "n" identical poles is the clearance attainable for construction of the stator windings for both primary and tertiary. Said multipolar construction also allows the possibility of altering the conductive material properties of disc inserts 1–4 to produce variations in the effective terminal impedance by making use of parallel connected primary members as shown in FIG. 13.

FIG. 14 shows the detailed equivalent circuit for the transverse flux fault limiter with superconducting excitation. $X_1$ is primary leakage reactance, $R_1$ is primary resistance, $X_{L2}$ and $X_{L1}$ are magnetizing or position-dependent reactances of the airgap, $X_2$ is secondary reflected leakage reactance, $R_2$ is the reflected secondary total load resistance, S—per unit slip of disc while accelerating or $(\omega_s-\omega_m)/\omega_2$, $\omega_m$ is mechanical speed and $\omega_s$=synchronous speed. $X_m$ is the magnetizing reactance of the tertiary coil 1 which is mutually coupled to the $X_{L1}$ or $X_{L2}$ magnetic path.

FIG. 15 a shows a simplified equivalent circuit where $X_1=0$, $X_2=0$ and primary resistance is negligible for both normal and SC windings for on-state where $X=X_{L2}$ and $R_2 \to \infty$ as the iron lamination become finer in thickness. FIG. 15 b is the off-state equivalent circuit where $X_{L1}$ is in parallel with $R_2/S$ where $R_2$ is finite and a low value since a moderate or highly conductive material forms the secondary member and thus $X_{L1}$ is shunted by $R_2/S$ parameter. If the disc is moving at maximum velocity (S=0) the terminal impedance is $Z_T=0+jX_{L1}$. At start, the disc velocity is zero, the terminal impedance is $$Z_{T2} = jX_{L1} \| R_2 = \frac{R_2 X_{L1}}{\sqrt{R_2^2 + X_{L1}^2}}$$

at phase angle $\theta = \tan^{-1}(R_2/X_{L1})$

By way of example, an acceptable range of $X_{L1}$ is 166–333 µH in the pre-fault mode and the corresponding series impedance is in the range 0.062–0.125 ohms at 60 Hz. An acceptable range of $Z_T$ when in the current limit mode is 3.77–7.54 ohms or a 60 Hz base.

The total series-injected impedance offered to the line will vary from $X_{L2}$ to $Z_{T2}$ over a 4 ms period. The invention provides means to adjust the $R_2$ parameter and ultimately $Z_{T2}$ by specific choice of rotor materials for conducting media such as copper, aluminum, bronze, etc.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An electrical fault limiter comprising:
   a first magnetic core;
   a second magnetic core opposing said first magnetic core;
   a third magnetic core adjacent the first magnetic core;
   a fourth magnetic core opposing said third magnetic core and adjacent said second magnetic core;
   a rotor disposed between the first and second magnetic cores, and the third and fourth magnetic cores, said rotor rotatable about a rotor axis, said first and second magnetic cores disposed on a first side of the rotor axis and said third and fourth magnetic cores disposed on a second side of said rotor axis;
   each core having a first axis, a second axis and a body to which the first and second axis are connected, each body having a superconduction bias coil disposed about it, each axis having a conduction load coil disposed about it, said rotor having a high magnetic reluctance sector and a return flux sector such that when the magnetomotive force from each superconduction bias coil balances with the magnetomotive force from associated load coils on an associated core there is no force on the rotor, but when the magnetomotive force from the superconduction bias coil is less than the magnetomotive force from associated load coils on the associated core then a force is produced on the rotor causing it to accelerate.

2. A fault limiter as described in claim 1 wherein each conduction load coil of each axis of each core has 101 turns for a nominal 600 amp current in the conduction load coils and the superconduction bias coil of each core has a height of 48 mm and a depth of 90 mm with a total coil window area of about 4.56 cm producing 121.2 KAT excitation for the primary electrical member and at least 182 KAT excitation per set of opposing cores linked to the superconduction bias coil.

3. A fault limiter as described in claim 1 wherein the conduction load coil is a superconduction load coil.

4. A fault limiter as described in claim 3 wherein the first, second, third and fourth magnetic cores comprise a primary electrical member and the rotor comprises a secondary electrical member, with the primary member arranged in a multipolar structure around a 360° or smaller angle.

5. A fault limiter as described in claim 4 wherein the secondary member has a high magnetic reluctance zone which is disposed between the first and second cores and the third and fourth cores.

6. A fault limiter as described in claim 5 wherein the secondary member comprises a zoned-rotor disc having the high magnetic reluctance zone with radial dimension $\alpha_1$, said reluctance zone comprising a solid conducting medium which is not ferromagnetic, and a return flux sector disposed adjacent the high magnetic reluctance zone, said return flux sector has radial dimension $\alpha_2=\alpha_1$ with an equal amount of flux passing through the high magnetic reluctance zone as the return flux sector.

7. A fault limiter as described in claim 6 wherein each core has a radial core dimension $\alpha_4$ essentially equal to $\alpha_1$ and $\alpha_2$.

8. A fault limiter as described in claim 5 including an air gap disposed between the primary and secondary member and each core has a magnetic flux path which is transverse and crosses the airgap between each core and the secondary member, said magnetic flux path penetrating through the secondary member and crosses the airgap to reach the respective opposing core.

9. A fault limiter as described in claim 8 including an AC bus circuit connected to each conduction load coil such that when current in the conduction load coils exceeds a threshold current $I_T$, an electrodynamic reaction occurs between the primary and secondary members causing the secondary member to rotate relative to the primary member due to induced currents in the secondary member with a consequent increase in reflected impedance in the load conduction coil.

10. A fault limiter as described in claim 9 wherein the increase in reflected impedance after the current in the load conduction coils exceeds the threshold value is a ratio 60:1.

11. A fault limiter as described in claim 10 wherein the secondary member is made of an electrically conductive material which is not ferromagnetic; and including a shaft upon which the secondary member is mounted, and a reaction bar or torsion spring in connection with the shaft which transmits torque T to the reaction bar or torsion spring to limit arc movement of the secondary member to either 360° or a definite integral of 360° rotation.

12. A fault limiter as described in claim 11 wherein the secondary member also has a magnetic reluctance zone which includes a ferromagnetic insert which when moved into a spatial rotor position relative to the primary member by induction-repulsion action causes an increase in reflected impedance in the conduction load coils.

13. A fault limiter as described in claim 8 wherein the airgap between each core and the rotor is about 0.5 mm, the airgap between opposing cores is about 6.0 cm and the secondary electrical member has a thickness of about 5.9 cm.

14. A fault limiter as described in claim 8 including a high voltage line connected to each conduction load coil, and including a variable-frequency inverter connected to each superconductive bias coil to energize them, a step-down transformer connected to the variable-frequency inverter to feed the inverter, a frequency/phase controller connected to the inverter, and a current sensor which provides current input to the frequency/phase controller.

15. A fault limiter as described in claim 14 wherein each bias coil is operated in an AC mode at its same frequency as line voltage from the high voltage line, said inverter controlling what amount of asymmetrical component of current is fed to each bias coil to ensure control of each core under both symmetrical and asymmetrical short-circuit conditions.

16. A fault limiter as described in claim 15 wherein before a fault occurs bias current from the inverter feeds all the bias coils a total excitation equal to excitation produced by current $I_L$ from the high voltage line and net flux in the airgap is zero and the rotor remains stationary; and when a fault is detected by a rate of change of current $I_L$ at a di/dt value equal to or exceeding a predetermined value, a reverse bias to the bias coils is dropped, the bias current $I_b=0$ and current $I_L$ is used to provide repulsion-induction torque on the rotor to effect a rapid change in magnetic reluctance regarding the rotor causing the rotor to rotate through an angle $\theta_1$ in one-quarter cycle and produces a consequent low reluctance characteristic, and after the angle $\theta_1$ is attained, the inverter changes to a rectifier mode to produce a DC bias current output for which to magnetically hold the rotor in a fixed on-state position and retain a low magnetic reluctance position.

17. A fault limiter as described in claim 16 wherein the excitation to the bias coils may be biased forward in an AC mode to assist the load conduction coils in accelerating the rotor and therefore change the magnetic reluctance at a faster rate than if the bias coils were not forward biased.

18. A fault limiter as described in claim 17 wherein the rotor is caused to reverse rotation by the frequency/phase controller removing the DC bias current and each bias coil is again excited in reverse AC bias mode to cause the rotor to reverse rotation and return it to a neutral position with a high reluctance mode.

19. A fault limiter as described in claim 18 wherein the primary member has a range of primary inductance of 166 to 333 µH in a pre-fault mode, corresponding to series impedance of 0.062 to 0.125 ohms at 60 Hz and when in a current limiting mode, the primary member's series impedance changes to between 3.77 and 7.54 ohms on a 60 Hz base.

20. A fault limiter as described in claim 19 wherein the series impedance of the primary member changes from the pre-fault mode to the current limiting mode in a 4 millisecond period.

* * * * *